United States Patent
Shen

(10) Patent No.: US 7,865,342 B2
(45) Date of Patent: Jan. 4, 2011

(54) LEAKAGE PATH SIMULATION SYSTEM AND LEAKAGE PATH SIMULATION METHOD

(75) Inventor: Jianrong Shen, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1026 days.

(21) Appl. No.: 11/643,343

(22) Filed: Dec. 21, 2006

(65) Prior Publication Data

US 2007/0146363 A1 Jun. 28, 2007

(30) Foreign Application Priority Data

Dec. 27, 2005 (JP) .............................. 2005-376089

(51) Int. Cl.
*G06G 7/48* (2006.01)
*G06G 7/56* (2006.01)

(52) U.S. Cl. ................................. 703/8; 703/7; 703/9

(58) Field of Classification Search ................ 703/1, 703/2, 6, 7, 8, 9
See application file for complete search history.

(56) References Cited

U.S. PATENT DOCUMENTS

| | | | | |
|---|---|---|---|---|
| 6,081,654 | A | * 6/2000 | Morman et al. | 703/1 |
| 6,510,357 | B1 | * 1/2003 | Naik et al. | 700/98 |
| 7,346,474 | B2 | 3/2008 | Shen | |
| 2004/0210189 | A1 | 10/2004 | Shadwell et al. | |
| 2005/0269207 | A1 | 12/2005 | Shen | |

FOREIGN PATENT DOCUMENTS

| GB | 2 345 772 A | 7/2000 |
|---|---|---|
| JP | 06-258171 | 9/1994 |
| JP | 2005-346360 | 12/2005 |

OTHER PUBLICATIONS

Hu et al., Simulation and analysis of assembly processes considering compliant, non-ideal parts and tooling variations, Apr. 2001, International Journal of Machine Tools & Manufacture 41, pp. 2233-2243.*

Japanese Office Action issued Aug. 10, 2010 for priority Japanese Application No. 2005-376089.

Wong et al., "Automated generation of nodal representations for complex building geometries in the Semper environment", *Automation in Construction*, 10 (2000), pp. 141-153.

European Search Report corresponding to counterpart European Application No. 06026081.7 dated Aug. 25, 2010.

* cited by examiner

*Primary Examiner*—Jason Proctor
*Assistant Examiner*—Aniss Chad
(74) *Attorney, Agent, or Firm*—Smith, Gambrell & Russell, LLP

(57) ABSTRACT

A computer reads data from a database in an external recording device to generate an analysis model which represents the surface profile of a member with a mesh. Next, the computer initializes the meshes of the analysis model by setting thereto a gas attribute corresponding to a non-leakage site and thereafter sets to any mesh a liquid attribute corresponding to a leakage site, and changes the attribute of meshes adjacent to the meshes having the liquid attribute from the gas attribute to the liquid attribute. Then, the computer connects meshes of which attribute has been set to the liquid attribute to generate a leakage path and outputs information relating to the leakage path on a display device.

9 Claims, 8 Drawing Sheets

Mo (BOUNDARY CONDITION : BACK FACE MESH, LIQUID)

FIG.14

| MESH NO. | NODE 1 | NODE 2 | NODE 3 | NODE 4 | ADJACENT MESH | ADJACENT MESH | MEMBER NO. | FRONT/BACK CODE | FREE EDGE | ATTRIBUTE |
|---|---|---|---|---|---|---|---|---|---|---|
| 001 | 001 (x, y, z) | 002 (x, y, z) | 003 (x, y, z) | 004 (x, y, z) | - | 002 | 01 | 0 | 1 | 1 |
| 002 | 003 (x, y, z) | 004 (x, y, z) | 005 (x, y, z) | 006 (x, y, z) | 001 | 003 | 01 | 0 | 0 | 1 |
| 003 | 005 (x, y, z) | 006 (x, y, z) | 007 (x, y, z) | 008 (x, y, z) | 002 | 004 | 01 | 0 | 0 | 1 |
| 004 | ... | ... | ... | ... | ... | ... | 01 | 0 | 0 | 1 |
| 005 | ... | ... | ... | ... | ... | ... | 01 | 0 | 0 | 1 |
| 006 | ... | ... | ... | ... | ... | ... | 01 | 0 | 0 | 1 |
| 007 | 013 (x, y, z) | 014 (x, y, z) | 015 (x, y, z) | 016 (x, y, z) | 006 | - | 01 | 0 | 1 | 1 |
| 008 | 015 (x, y, z) | 016 (x, y, z) | 017 (x, y, z) | 018 (x, y, z) | - | 009 | 01 | 1 | 1 | 1 |
| 009 | ... | ... | ... | ... | ... | ... | 01 | 1 | 0 |  |
| 010 | ... | ... | ... | ... | ... | ... | 01 | 1 | 0 |  |
| 011 | ... | ... | ... | ... | ... | ... | 01 | 1 | 0 |  |
| 012 | ... | ... | ... | ... | ... | ... | 01 | 1 | 0 |  |
| 013 | ... | ... | ... | ... | ... | ... | 01 | 1 | 0 |  |
| 014 | ... | ... | ... | ... | 013 | - | 01 | 1 | 1 |  |

LEAKAGE PATH SIMULATION SYSTEM AND LEAKAGE PATH SIMULATION METHOD

This application claims benefit of Japanese Application No. 2005-376089 filed on Dec. 27, 2005, the contents of which are incorporated by this reference.

BACKGROUND OF THE INVENTION

1. Field of the Invention

The present invention relates to a leakage path simulation system and a leakage path simulation method of predicting a leakage path in a structure formed by joining a plurality of members.

2. Description of the Related Art

Generally, in a vehicle such as an automobile, pressed steel sheets are joined by such as welding to form a body shell. When there is any gap between parts in such a body shell, water penetration into the interior from outside the vehicle will cause an interference to driving, a formation of rust, a buildup of soil, etc. and therefore it is a necessity to conduct a leakage test on all of the finished vehicles after manufacture.

Conventionally, such a leakage test can be found by methods using a stationary shower tester, the test apparatus disclosed in Japanese Patent Laid-Open, No. 6-258171, etc. The shower tester is configured such that water is injected to a vehicle with water spray apparatus such as a car washing machine and, after continuing such water injection for several tens of hours, water penetration into the vehicle interior is confirmed; such a method has a drawback in that actual running conditions are not taken into consideration since the vehicle is tested in a stationary condition. The test apparatus disclosed in Japanese Patent Laid-Open No. 6-258171 takes into account the drawback of the shower tester so that a leakage test of the seal portion of a vehicle door can be conducted in an actual running condition.

On the other hand, it is possible to use a known fluid analysis to predict an occurrence of water leakage in a structure as the solution of a two-phase flow problem of air and water, and if water leakage can be predicted before the manufacture of the product, quality improvement and cost reduction of the product will be expected.

However, in a case in which the structure of interest has a complicated shape like a vehicle body, applying fluid analysis will be difficult since not only it will require a complicated analysis processing by a large scale system taking a large amount of time, but also there is a risk that the solution of the fluid model is not convergent.

SUMMARY OF THE INVENTION

It is an object of the present invention to provide a leakage path simulation system and a leakage path simulation method which can simplify the analysis processing needed for predicting a leakage path thereby enabling efficient simulation.

A leakage path simulation system according to present invention comprises: a model generation unit configured to generate an analysis model whereby the surface profile of each member constituting the above-described structure is represented by a mesh; an attribute setting unit configured to initialize all the meshes in the above-described analysis model by setting thereto a gas attribute corresponding to a non-leakage portion, thereafter set a liquid attribute corresponding to a leakage portion to a mesh satisfying a boundary condition, and change the attribute of meshes adjacent to the mesh having the liquid attribute from the gas attribute to the liquid attribute; and a path generation unit configured to connect meshes having the liquid attribute between different members constituting the above-described structure to generate a leakage path.

Moreover, a leakage path simulation method according to the present invention comprises: a first processing of generating an analysis model whereby the surface profile of each member constituting the above-described structure is represented by a mesh; a second processing of initializing all the meshes in the above-described analysis model by setting thereto a gas attribute corresponding to a non-leakage portion, thereafter setting a liquid attribute corresponding to a leakage portion for a mesh satisfying a boundary condition, and changing the attribute of meshes adjacent to the mesh having the liquid attribute from the gas attribute to the liquid attribute; and a third processing of connecting meshes having the liquid attribute between different members constituting said structure to generate a leakage path.

BRIEF DESCRIPTION OF THE DRAWINGS

FIG. 14 is an explanatory diagram to show an example of the data structure for a mesh.

DESCRIPTION OF THE PREFERRED EMBODIMENT

Figure 1:
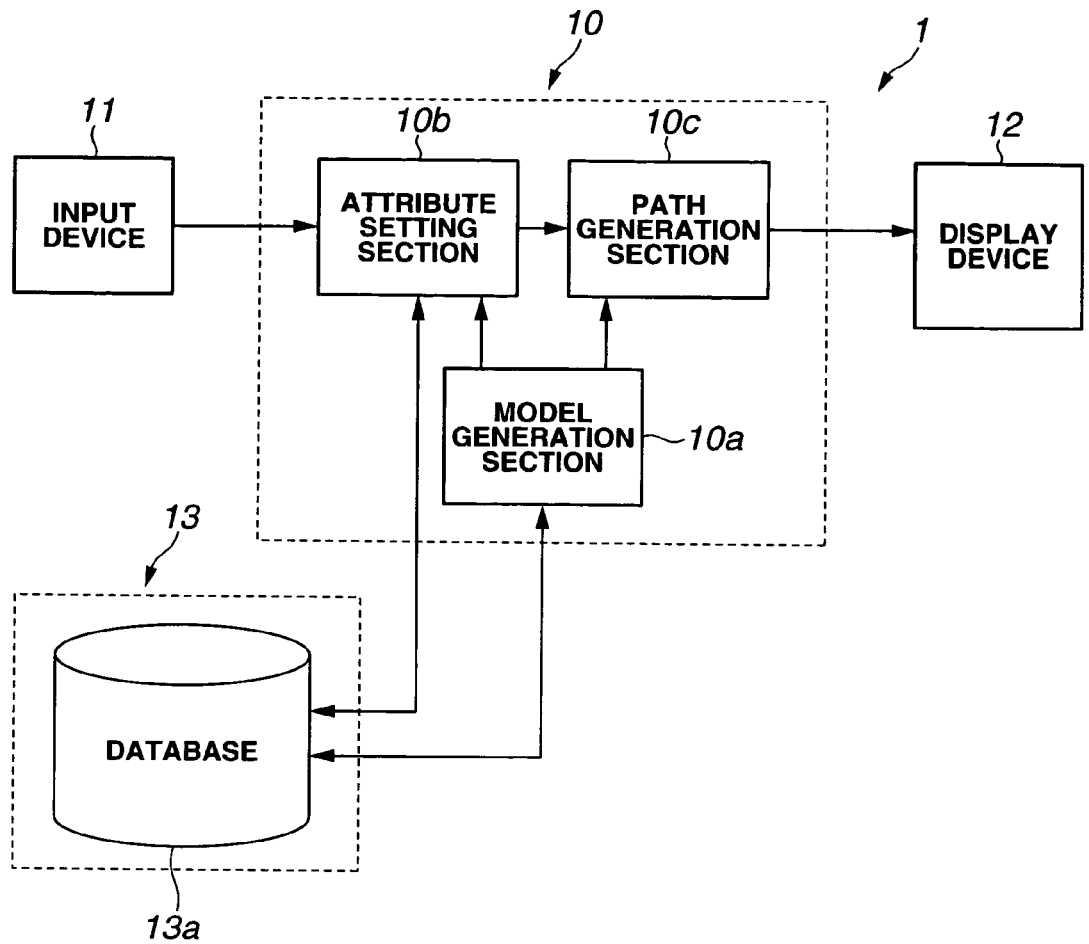
FIG. 1 is a basic configuration diagram of a leakage path simulation system.

As shown in FIG. 1, a leakage path simulation system 1 according to the present embodiment includes, as the basic configuration, a computer 10, an input device 11 such as a key board and a mouse, a display device 12 such as a CRT and a liquid crystal display, and an external storage device 13 such as a magnetic disk. The computer 10 may employ a relatively small, general purpose computer such as a micro computer and a personal computer, primarily constituting an internal memory such as a CPU, ROM, and RAM, an input/output interface, and others, and is configured to store in advance a program relating to leakage path simulation processing in a ROM, or load a program relating to leakage path simulation processing from the storage medium storing it, and execute the program to implement functions of respective sections 10a to 10c which functionally represent respective processing relating to the leakage path simulation.

In the present embodiment, a case of predicting a leakage path and outputting a simulation result for display on the display device 12 will be described for a structure in which panel members formed by joining a plurality of sheet metal members by such as welding are arranged in a layered configuration like an automobile body shell.

The functions of the leakage path simulation system implemented by the computer 10 can be represented by a model generation section 10a, an attribute setting section 10b, and a path generation section 10c. The model generation section 10a generates an analysis model in which an analysis object is represented by a mesh. The present embodiment employs as the analysis model, a surface model with which the surface profile of a member is represented by a mesh; this surface model is applied to two faces i.e. front and back faces of each member and the surface models for each member are arranged in a three-dimensional space so as to generate an analysis model.

Each individual mesh in the analysis model is configured to have a rectangular shape regardless of the shape of the analysis object because of ease of representing such shape, and is arranged in a grid-like manner. Moreover, the number of meshes per unit area can be set arbitrarily depending on analysis precision. For example, when the surface profile of an object is a complex curved surface, or when the analysis of leakage path is performed at a high precision, the mesh is set densely. On the contrary, when the surface profile of the object is simple, or when the determination of a leakage path is performed at a low precision, the mesh is set more sparsely than in the forgoing. Moreover, the shape of mesh is not limited to a rectangular shape, and other shapes such as a triangular as well as polygonal shape may be used.

Each individual mesh is assigned, for example, a mesh number for identifying itself, coordinate values (coordinate values in x, y, and z axes in a three-dimensional space) of the nodes of the mesh with respect to a predetermined reference point, an attribute of the mesh, etc. The attribute of the mesh is set by the attribute setting section 10b either to a gas attribute corresponding to a non-leakage location or a liquid attribute corresponding to a leakage location. The attribute setting section 10b, first, initializes all the meshes in the analysis model by setting thereto a gas attribute, and changes the attribute of any mesh satisfying a boundary condition to a liquid attribute. Then, the attribute of any mesh adjacent to meshes having the liquid attribute is further changed from the gas attribute to the liquid attribute.

The path generation section 10c connects meshes of which attribute has been set to the liquid attribute to generate a leakage path and outputs information relating to the leakage path on the display device 12. At this time, when a joint portion between two members is a leakage location, information is displayed as a leakage portion in the path, and when a joint portion between two members is sealed with a polymer sealant (PS) etc., the length of a seal portion (hereinafter referred to as a "PS portion") is calculated and a total of the seal length of each PS portion is displayed. The operator can refer to the information relating to the leakage path and leakage portion displayed on the display device 12 to arbitrarily set a PS portion by manipulating the input device 11 such as a mouse.

In the exterior storage device 13, there are stored various databases necessary for analyzing leakage path. The present embodiment utilizes a data base 13a constituting a group of attribute records in which an individual identification number (a record number) is assigned to each object to be analyzed. In each attribute record, primarily a mesh number, node point coordinate values, an attribute, etc. for each mesh are described in association with each other.

Next, the concept of analysis technique of leakage path in the present embodiment will be described. Herein, for a panel-like structure formed by joining multiple sheet metal members by such as welding like an automobile body shell, an example of predicting a leakage path in such a structure will be described.

Figure 2:
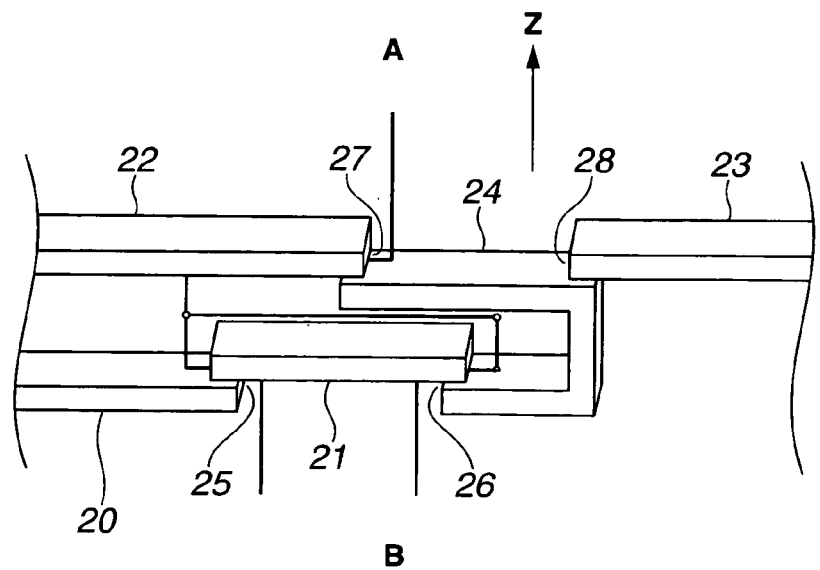
FIG. 2 is an explanatory diagram of a leakage path.
Figure 3:
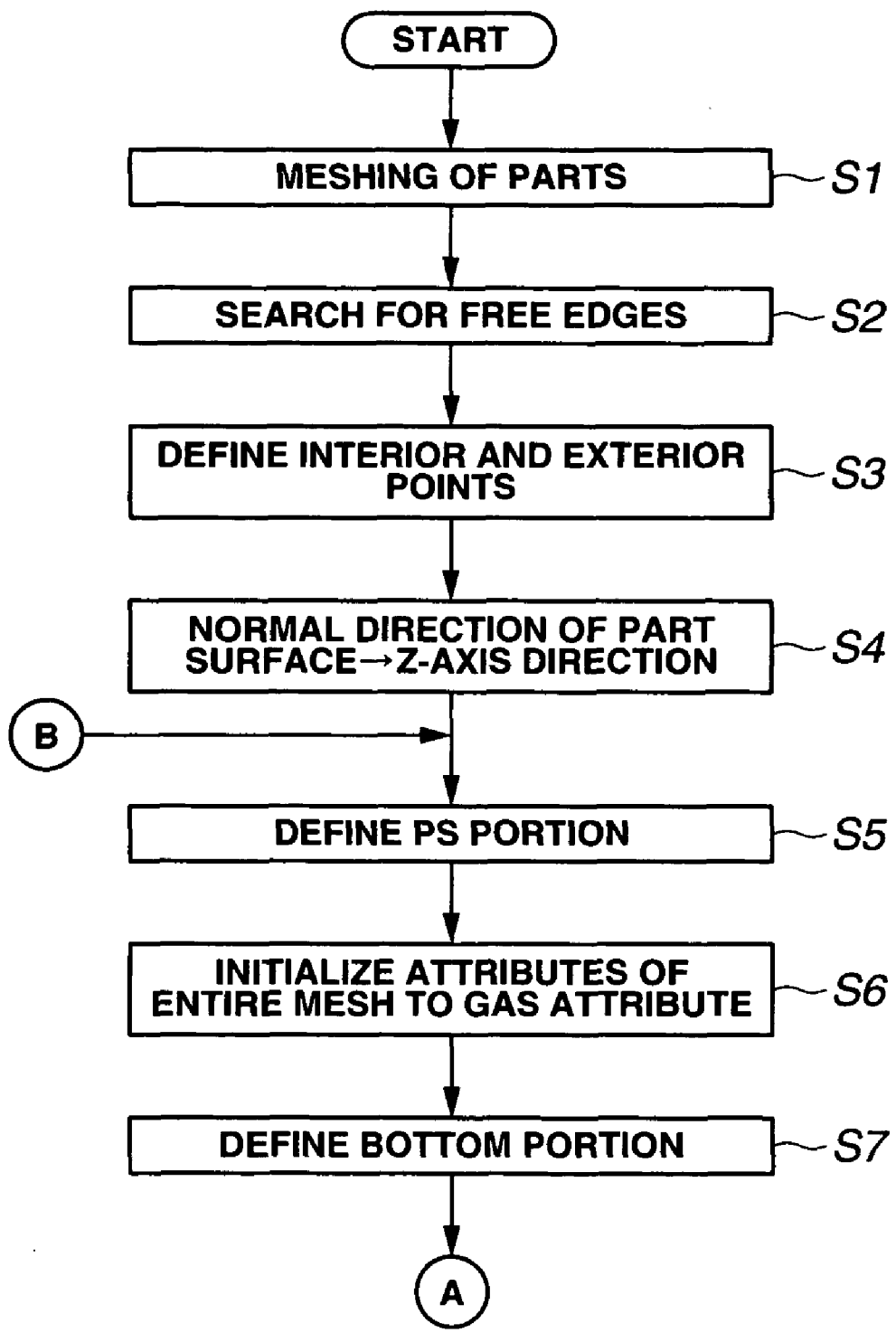
FIG. 3 is a flowchart of the leakage path simulation processing.
Figure 4:
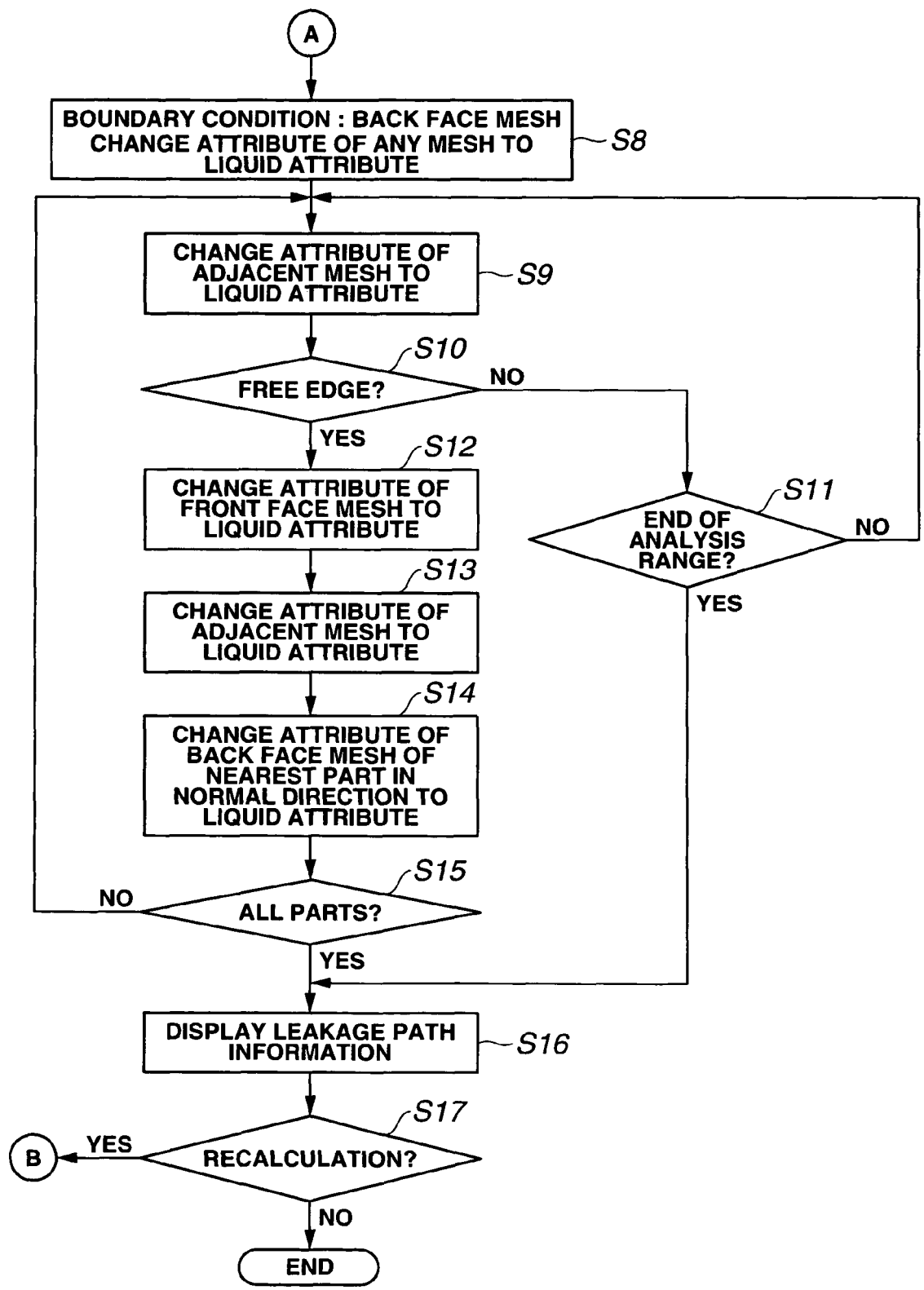
FIG. 4 is a continuing flowchart of FIG. 3.

As shown in FIG. 2, considering a case in which a space A and a space B are separated in the z-axis direction with a two-layered structure in which a lower panel formed by joining sheet-like members 20 and 21 by such as spot welding and an upper panel consisting of sheet-like members 22 and 23 are joined via a substantially U-shaped member 24, a leakage path between the spaces A and B depends on the condition of the joint portion of each member. In FIG. 2, there are a total of four joint portions: two joint portions 25 and 26 in the lower panel and two joint portions 27 and 28 in the upper panel.

The basic principle of the present analysis method assumes that all the joint portions 25 to 28 would be subject to leakage unless they are sealed by such as applying a sealant and, on the other hand, all the sites on the surface of each member 20 to 24 may form a leakage path. This analysis method is designed to set attributes of different material properties, which are a liquid simulating water and a gas simulating air, to individual meshes constituting the analysis model, and to search the continuity in the z-axis direction of the meshes having the liquid attribute thereby determining a leakage path running over different members located at different positions in the z-axis direction.

The continuity of meshes in the z-axis direction is decided by determining the continuity of two surface meshes on the front and back faces of a member. That is, when one end of a member is open to air or joined to another member without sealing, these locations are defined as a "free edge" and it is assumed that via this free edge, a front face mesh and a back face mesh are continuous in one member, and between different members, the meshes on the faces opposing each other in the z-axis direction share the same attribute. And when a joint portion of members is sealed by such as applying a sealant, the joint portion is defined as the "PS portion," and it is assumed that the meshes on the same side of the two members are continuous via the PS portion.

In other words, when the joint portion between two members is a free edge, that location is treated as a leakage location, and when the joint portion between two members is the PS portion, the two members are treated as a single integrated member. Therefore, in FIG. 2, when the joint portions 25 to 27 of three locations are not sealed (free edges) and the joint portion 28 is sealed (the PS portion), a leakage path between spaces A and B as shown is predicted, and when the joint portion 27 is the PS portion or the joint portions 25 and 26 are both PS portions, it can be predicted that there is no leakage path between the spaces A and B.

The above described leakage path simulation processing will be described with reference to the flowcharts of FIGS. 3 and 4, and FIGS. 5 to 13. In the following, given a floor panel of a vehicle such as an automobile being as the analysis object, a case of predicting a penetration path of water from the roadside to the vehicle interior as the leakage path in the floor panel will be described.

In this leakage path simulation processing, first, in step S1, according to the manipulation of the input device 11 by the operator, data relating to the analysis object (a floor panel in this embodiment) are read from the database 13a, and an analysis model is generated. This analysis model is, as shown in FIG. 5, a model in which the surface profile of each member is meshed with multiple area elements and, in the present embodiment, each member is meshed in two faces which are front and back faces of one member.

Figure 5:
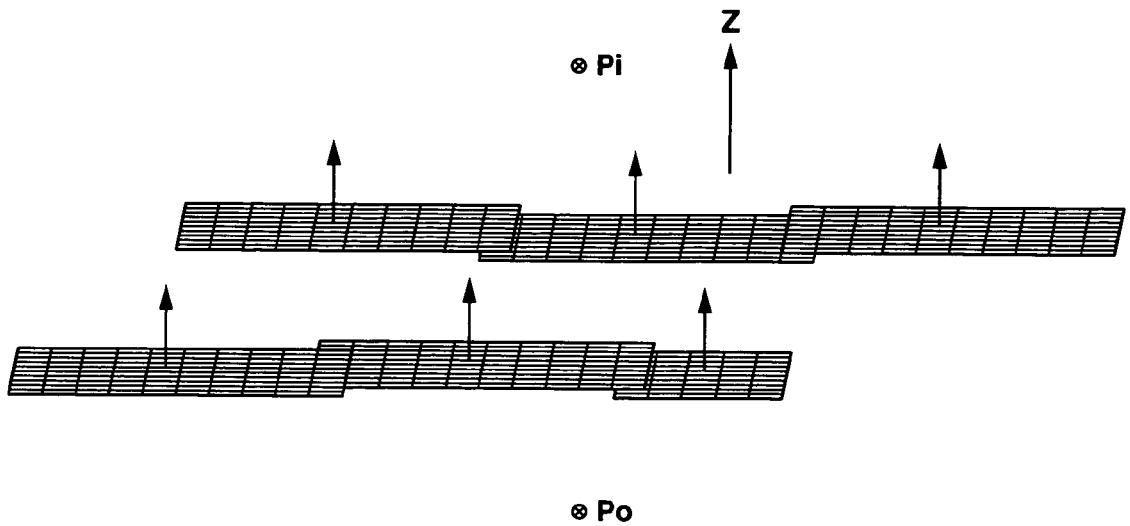
FIG. 5 is an explanatory diagram to show the meshing of parts and the setting interior and exterior points.

Next, advancing to step S2, free edges of each member are searched and in step S3, members exposed to the interior side and members exposed to the road side are identified, thereby defining an arbitrary reference point on the interior side as an interior point Pi and an arbitrary reference point on the road side as an exterior point Po as shown in FIG. 5. Then, in step S4, the normal direction of the part surface is aligned with the z-axis direction opposite to gravity.

Figure 6A:
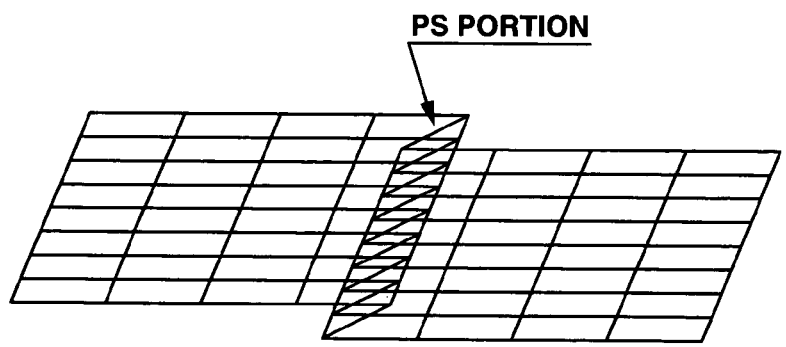
FIG. 6 is an explanatory diagram to show the definition of a seal portion.
Figure 6B:
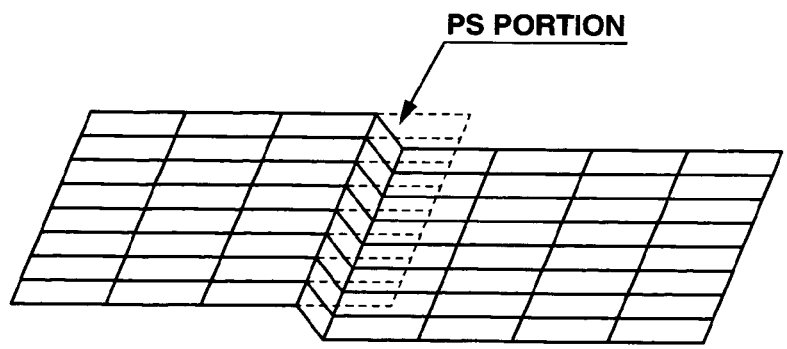

Thereafter, in step S5, PS portions each of which seal the joint portion between members are defined. PS portions can be arbitrarily specified; for example, when the operator specifies a PS coating region by manipulating the input device 11 such as a mouse to the analysis model which is graphically displayed, the specified location is defined as a PS portion and as shown in FIG. 6a, meshes on the same side of each adjacent member are connected together and treated continuously. In this case, as shown in FIG. 6b, it is also possible to connect two members by replacing the coordinate values of node points of a free edge of one member with the coordinate values of node points of a free edge of the other member thereby treating them continuously.

Moreover, when there is no operation input to specify the PS portion, it is assumed that all the joint portions in principle do not fulfill the conditions of the PS portion; however, the joint portions which are predetermined to be sealed as an absolute condition are defined as the PS portion.

Figure 7:
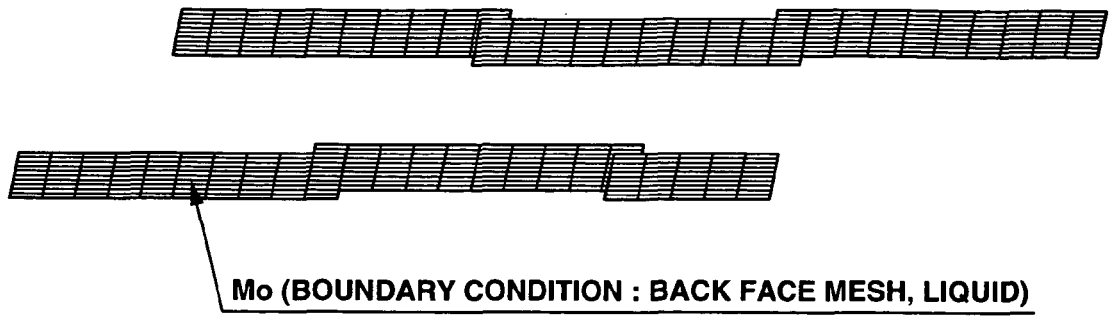
FIG. 7 is an explanatory diagram to show a back face mesh.

Then, advancing to step S6, for all the members, the attributes of the front face and back face meshes are initialized to be a gas attribute and, in step S7, the member which is located closest to the exterior point in the z-axis direction is defined as a bottom portion. Then, in step S8, the attribute of an arbitrary mesh on the exterior-point-side face of the member of the bottom portion is set to a liquid attribute. That is, supposing that for each member, the exterior-point-side face is a back face and the interior-point-side face is a front face, the attribute of an arbitrary mesh M0 from the back face meshes of the bottom portion is changed from the gas attribute to the liquid attribute as a boundary condition, as shown in FIG. 7. In this connection, the arbitrary mesh to provide the boundary condition is supposed to be at one or more locations.

In step S9 following step S8, for other meshes adjacent to the foregoing mesh on the back face, the attribute is changed from the gas attribute to the liquid attribute. In association with this, in the database 13a, the attribute of the mesh to be processed are changed from the gas attribute to the liquid attribute. Then, in step S10, it is determined whether or not a next adjacent mesh has a free edge, and when it has no free edge, the process advances to step S11 and if it has a free edge, the process advances to step S12.

If a mesh has no free edge, in step S11, it is checked whether or not the mesh is at the end of the analysis range. In the floor panel according to the present embodiment, for example, it is supposed that the site at which the floor panel is connected to a side panel is the end of analysis range and that there is no leakage at this connection portion. Then, when the mesh is not at the end of the analysis range, returning from step S11 to step S9, the processing is continued, and when the mesh is at the end of the analysis range, jumping from step S11 to step S16, the display processing of the leakage information is performed. This display processing will be described below in detail.

In this case, the liquid attribute will be set as far as the end of the analysis range with no free edge being on the back face meshes, and thus the liquid attribute will not be set to the front face meshes of the members exposed to the interior side. Therefore, the display processing of the leakage information in step S16 involves processing such as a graphic display of the leakage path not reaching the interior point and a message display to indicate that there is no leakage path from an exterior point to an interior point. Thereafter, advancing on from step S16 to step S17, a message whether or not the recalculation of the leakage path is performed is outputted for display, and if there is an instruction input of recalculation, returning to step S5, the PS portion is redefined, and when there is no instruction input of recalculation, the present processing is finished.

On the other hand, if the mesh has a free edge in step S10, the processing target is shifted from the back face mesh to the front face mesh via the free edge of the member of interest, and the attribute of the front face mesh is changed from the gas attribute to the liquid attribute in step S12. In the following step S13, the attribute of adjacent meshes is changed from the gas attribute to the liquid attribute, and in step S14, processing target is shifted to the back face mesh of the closest part in the normal direction (z-axis direction) and the attribute of this back face mesh is changed from the gas attribute to the liquid attribute.

Thereafter, advancing to step S15, it is checked whether or not processing of all the parts is finished. If the processing is not finished on all the parts, returning from step S15 to step S9, the processing is continued, and if the processing is finished for all the parts, advancing from step S15 to step S16, the display processing of leakage information is performed. Then, in step S17, a message whether or not the recalculation of the leakage path is performed is outputted for display, and if there is an instruction input of recalculation, returning to step S5, the PS portion is redefined, and if there is no instruction input of recalculation, the present processing is finished.

The display of leakage information includes, for example, a graphic display of the leakage path and the leakage locations in the path, in which a leakage path from the exterior side to the interior side is created by connecting meshes having the liquid attribute to graphically display the created leakage path, and also leakage locations in the path are displayed with enhancement through the blinking of a symbol, etc. Further, when the PS portion is defined, a processing such as summing up the lengths of all the PS portions and numerically displaying the total seal length is performed.

Figure 8:
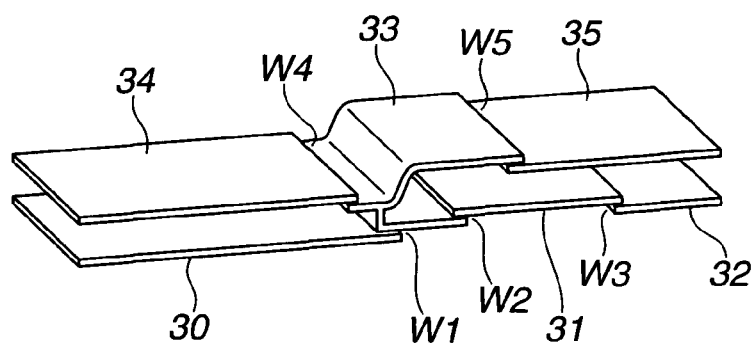
FIG. 8 is an explanatory diagram to show an example of a simplified model of a floor panel.

FIG. 8 shows a simplified model of a floor panel. In this simplified model, sheet metal members 30 to 32 on the exterior side and the sheet metal members 34 and 35 on the interior side are stiffened by a substantially rail-like frame member 33, and there are joint portions W1 to W3 at three locations (joint portion W1 between the sheet metal member 30 and the frame member 33, the joint portion W2 between the frame member 33 and the sheet metal member 31, and the joint portion W3 between the sheet metal member 31 and the sheet metal member 32) on the exterior side, and there are joint portions W4 and W5 at two locations (joint portion W4 between the sheet metal member 34 and the frame member 33 and joint portion W5 between the frame member 33 and the sheet metal member 35) on the interior side.

Figure 9:
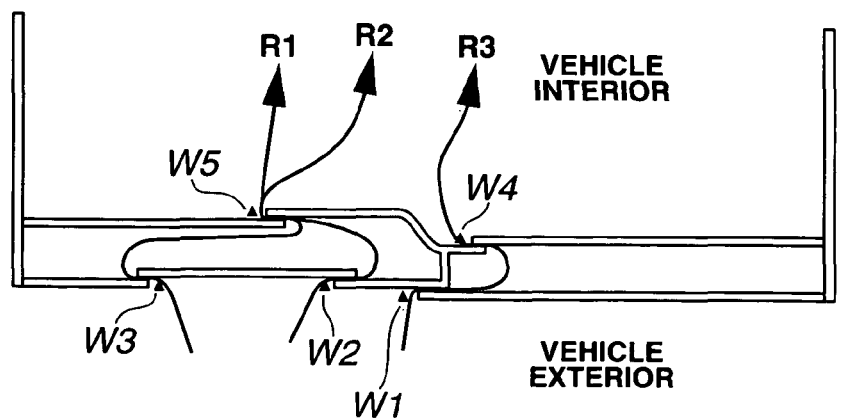
FIG. 9 is an explanatory diagram to show a display example of a leakage path.

When the above described processing is performed on this simplified model as the analysis object, in a state in which each of the joint portions W1 to W5 is not defined as the PS portion, in the display processing in step S16, for example, three leakage paths R1 to R3 are graphically displayed as shown in FIG. 9. At the same time, it is indicated by the blinking display of the symbol "▲" that each of the joint portions W1 to W5 is a leakage location, thereby stressing the need for PS coating.

Moreover, instead of graphically displaying a leakage path with a line, it is also possible, for example, to display meshes having the liquid attribute with a color different from that of meshes having the gas attribute.

Figure 10:
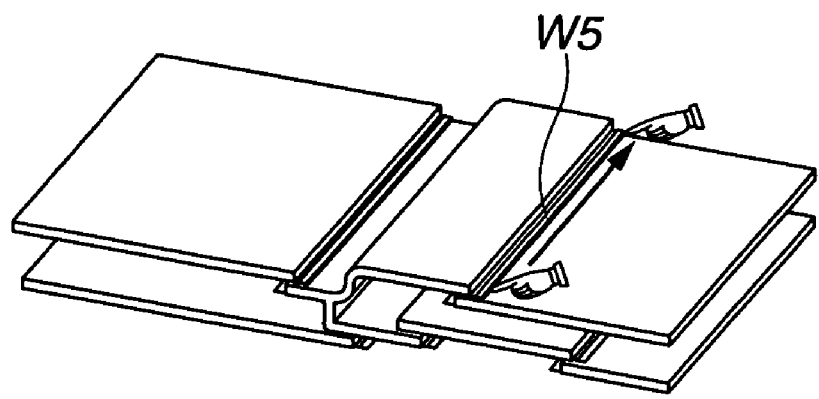
FIG. 10 is an explanatory diagram to show the designation of a seal portion.

Furthermore, if the operator instructs recalculation of the leakage path upon viewing the display of FIG. 9, and defines the PS portion by manipulating the input device 11 such as a mouse (step S5), the recalculation of leakage path is performed according to this definition of PS portion. For example, as shown in FIG. 10, if a PS coating range is specified using a mouse onto the simplified model of a floor panel which is graphically displayed, this PS coating portion (joint portion W5 between the sheet metal member 35 and the frame member 33 in FIG. 10) is defined as the PS portion, and the leakage path is recalculated resulting in a display of the leakage path as shown in FIG. 11.

Figure 11:
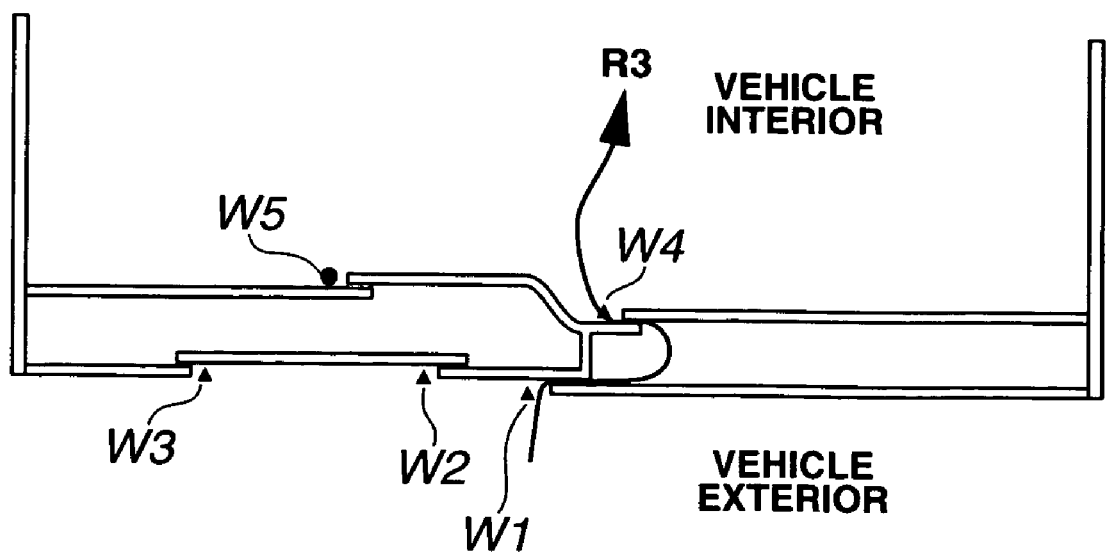
FIG. 11 is an explanatory diagram to show a display example of a leakage path after recalculation.

In FIG. 11, it is shown that as the result of the recalculation, although two leakage paths R1 and R2 communicating from the exterior side to the interior side can be eliminated, the leakage path R3 still remains. In this display, the PS portion is indicated by the symbol "●". Further, though not shown, the length of each PS portion is calculated and the total seal length is displayed by a numerical value, or an illustration to visually show the magnitude of the length. The operator retries the PS portion in consideration of the length of the PS portion, the workability thereof, etc.

In this trial process of the PS portion, it is necessary to take into account the demerits such as cost and weight increases by the PS coating, and the workability of the coating operation by a robot or an operator, and therefore locations at which PS coating can be performed without being disturbed by the adjacent parts must be chosen. Therefore, when the PS portion is specified, two faces of the members relating to the foregoing PS portion are determined and the level of workability is evaluated from the angle formed by respective faces and the distances from the adjacent parts. And, if the workability is determined to be inferior, a warning is displayed and a change to other locations will be prompted.

Figure 12:
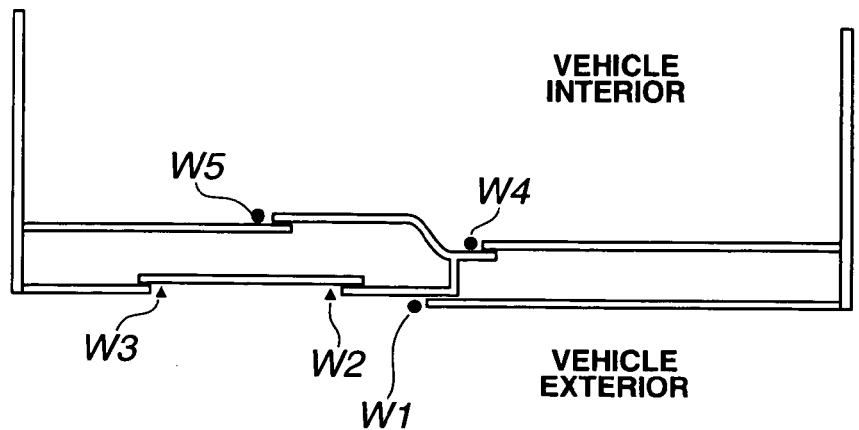
FIG. 12 is an explanatory diagram to show a candidate for a seal portion.

For example, to eliminate the leakage paths R3, as shown in FIG. 12, two potential candidates for the PS portion are considered, i.e., the joint portion W4 between the sheet metal member 34 and the frame member 33 and the joint portion W1 between the sheet metal member 30 and the frame member 33; however, the joint portion W4 is inferior in workability because it will require PS coating at an inmost location. Therefore, if the joint portion W4 is specified as the PS portion, a warning will be outputted thereby making it possible to change the PS portion to the joint portion W1 and thereby eliminate the leakage path R3 without sacrificing the workability.

Figure 13:
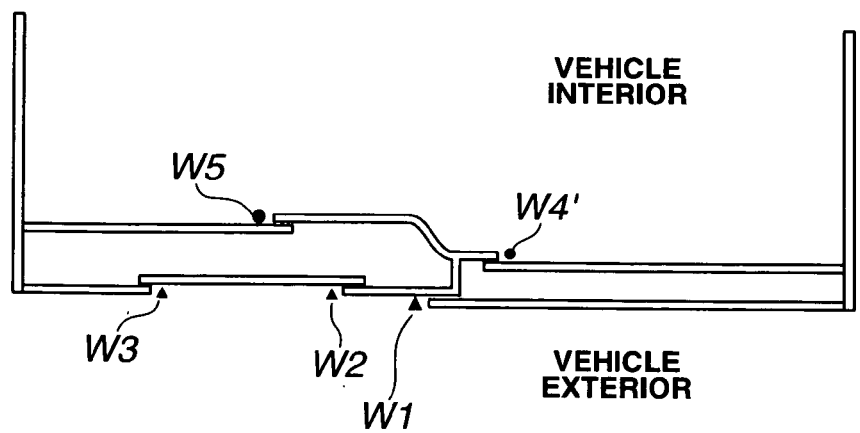
FIG. 13 is an explanatory diagram to show the alteration of a sheet assembly structure.

In this case, by avoiding the provision of the joint portion W1 located on the vehicle exterior side which is under a severe environmental condition as the PS portion, and by modifying the sheet metal assembly structure between the sheet metal member 34 and the frame member 33 as shown in FIG. 13 thereby setting the joint portion W4' which is on the vehicle interior side as the PS portion, it is made possible to set all the PS portions on the vehicle interior side and interrupt the leakage path, and thus to achieve a sheet metal assembly of which structure and location facilitates coating operation on the site where PS coating is needed.

Moreover, the PS trial processing can be, to some extent, automated by the computer 10. That is, since all the joint portions are a candidate for the PS portion, for example, by making a listing of and displaying possible combinations of PS portions and the total seal length by automatically selecting PS portions according to input conditions of the number of PS portions and the total seal length, etc. and making the operator to view them and exclude locations which are inferior in workability and disadvantageous in terms of cost, it is made possible to eventually maintain a good balance between quality and cost.

In the above described analysis model, by constructing a model without considering the thickness and joining sheet members having no thickness, it is possible to use the same mesh data for both the front and back faces of the member thus reducing the number of data and increasing the processing speed. However, it is also possible to take plate thickness into account, and use a model which represents the front and back faces of each member independently with a mesh, so that more accurate simulation of leakage path is possible.

FIG. 14 shows an example of data structure for a case in which the front and back faces of a member are represented by different meshes. Each member has mesh numbers, coordinate values (x, y, z) for node points of number 1, 2, 3, and 4 at four locations corresponding to a rectangular mesh, adjacent mesh numbers, member numbers, and front/back code for identifying the front and back faces; and a code for representing a free edge and a code for representing an attribute are set for each mesh number of the front and back faces respectively.

Figure 15:
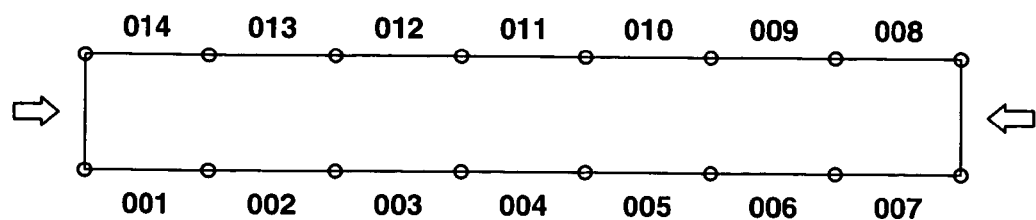
FIG. 15 is an explanatory diagram of mesh numbering.

For example, supposing that the back face is "0", the front face is "1", the free edge is "1", and the liquid attribute is "1", as shown in FIG. 15, for the member of member number 01, meshes 001, 002, . . . , 007 are assigned with back face code "0", and meshes 008, 009, . . . , 014 are assigned with front face code "1". Moreover, there is no mesh set on the sides of a member, and at both ends of a member as shown by an arrow in FIG. 15, the meshes 001 and 014 and the meshes 007 and 008 are discontinuous without connection thus forming a free edge respectively.

Even in a model in which the front and back faces of a member is represented by a different mesh, it is possible to predict a leakage path by the similar processing as described above, and although the meshes are not made continuous between the front and back faces for a free edge at an end of a member, the attribute of one face is continuously taken over to the other face. Moreover, when PS coating is performed, the free edge of that node is eliminated and as described relating to FIG. 6b, meshes of each of the members are made continuous.

As described so far, in the present embodiment, since the surface profile of a structure is represented by meshes and a leakage path is predicted from the attribute thereof, it is possible to simplify the processing thereof compared to a case in which fluid analysis etc. are applied. Moreover, since whether or not the attribute of the mesh to be processed is to be changed is determined according to the attribute of adjacent meshes, no complicated analysis processing is needed thereby making it possible to increase the speed and the efficiency of analysis processing thereby enabling the processing by a relatively small scale system.

Moreover, although the present embodiment generated an analysis model by using a rectangular mesh, the present invention will not be limited in this respect, as a polygonal mesh such as triangular and pentagonal meshes may be used. Furthermore, the program which is executable by the computer that performs the analysis method according to the embodiments as described above, by itself serves as part of the present invention. As a matter of course, recoding medium in which this computer program is recorded may be provided to the system having a configuration as shown in FIG. 1. In this case, the computer 10 within the system can read and execute the computer program stored in the recording medium so as to achieve the purpose of the present invention.

Further, since the computer program itself implements a novel function of the present invention, the recording medium which records the program also constitutes the present invention. The recording medium for recording such computer programs includes, for example, CD-ROMs, flexible disks, hard disks, memory cards, optical disks, DVD-ROMs, DVD-RAMs, etc.

In the present invention, it is obvious that various embodiments which differ in a wide range can be configured according to the present invention without departing from the spirit and scope of the invention. The present invention will not be limited by particular embodiments thereof, and will only be limited by the claims appended hereto.

What is claimed is:

1. A leakage path simulation system for predicting a leakage path of a structure formed by joining a plurality of members, comprising:
    a model generation unit configured to generate an analysis model whereby the surface profile of each member constituting said structure is represented by a mesh;
    an attribute setting unit configured to initialize all the meshes in said analysis model by setting thereto a gas attribute corresponding to a non-leakage portion, thereafter set a liquid attribute corresponding to a leakage portion to a mesh satisfying a boundary condition, and change the attribute of meshes adjacent to the mesh having the liquid attribute from the gas attribute to the liquid attribute; and
    a path generation unit configured to connect meshes having the liquid attribute between different members constituting said structure to generate a leakage path.

2. A leakage path simulation system according to claim 1, wherein said attribute setting unit is configured to set the attribute of meshes of mutually opposing sites between different members to a same liquid attribute when the joint portion between respective members constituting said structure is not sealed.

3. A leakage path simulation system according to claim 1, wherein said model generation unit sets a mesh on each of the front and back faces of each individual member constituting said structure, and said attribute setting unit sets an attribute to the mesh of each of said front and back faces such that the attributes of opposing faces of respective members adjacent to each other are said changed attribute.

4. A leakage path simulation system according to claim 1, wherein meshes of respective members on both sides of a sealed portion of the structure are connected when sealing a joint portion between respective members constituting said structure.

5. A leakage path simulation system according to claim 2, wherein meshes of respective members on both sides of a sealed portion of the structure are connected when sealing a joint portion between respective members constituting said structure.

6. A leakage path simulation system according to claim 3, wherein meshes of respective members on both sides of a sealed portion of the structure are connected when sealing a joint portion between respective members constituting said structure.

7. A leakage path simulation system according to claim 1, wherein said path generation unit outputs the information relating to said generated leakage path on a display device.

8. A leakage path simulation method for predicting a leakage path of a structure formed by joining a plurality of members, comprising:
    a first processing of generating an analysis model whereby the surface profile of each member constituting said structure is represented by a mesh;
    a second processing of initializing all the meshes in said analysis model by setting thereto a gas attribute corresponding to a non-leakage portion, thereafter setting a liquid attribute corresponding to a leakage portion for a mesh satisfying a boundary condition, and changing the attribute of meshes adjacent to the mesh having the liquid attribute from the gas attribute to the liquid attribute; and
    a third processing of connecting meshes having the liquid attribute between different members constituting said structure to generate a leakage path.

9. The leakage path simulation method according to claim 8, wherein in said second processing, an attribute is set on each of the front and back faces of meshes of each individual member constituting said structure respectively so that the attributes of opposing faces of each of members adjacent to each other are said changed attribute.

* * * * *